(12) United States Patent
Hotaka (10) Patent No.: US 12,052,451 B2
(45) Date of Patent: Jul. 30, 2024

(54) RE-MULTIPLEXING APPARATUS, BROADCASTING SYSTEM, RE-MULTIPLEXING METHOD, AND NON-TRANSITORY COMPUTER READABLE MEDIUM STORING PROGRAM

(71) Applicant: NEC Platforms, Ltd., Kawasaki (JP)

(72) Inventor: Tomoaki Hotaka, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 18/014,277

(22) PCT Filed: Jun. 23, 2021

(86) PCT No.: PCT/JP2021/023861
§ 371 (c)(1),
(2) Date: Jan. 3, 2023

(87) PCT Pub. No.: WO2022/009684
PCT Pub. Date: Jan. 13, 2022

(65) Prior Publication Data
US 2023/0262276 A1    Aug. 17, 2023

(30) Foreign Application Priority Data

Jul. 6, 2020  (JP) ................................. 2020-116182

(51) Int. Cl.
*H04N 21/236* (2011.01)
*H04N 21/242* (2011.01)

(52) U.S. Cl.
CPC ..... *H04N 21/23608* (2013.01); *H04N 21/242* (2013.01)

(58) Field of Classification Search
CPC .................. H04N 21/23608; H04N 21/242
See application file for complete search history.

(56) References Cited

U.S. PATENT DOCUMENTS

| 2013/0044028 A1* | 2/2013 | Lea | H04L 27/2636 |
| | | | 342/359 |
| 2018/0013516 A1* | 1/2018 | Zoellner | H04H 20/423 |
| 2018/0288452 A1* | 10/2018 | Le Garjan | H04N 21/845 |

FOREIGN PATENT DOCUMENTS

| JP | 2015-095679 A | 5/2015 |
| JP | 2018-191149 A | 11/2018 |
| WO | 2018/155544 A1 | 8/2018 |

OTHER PUBLICATIONS

International Search Report for PCT Application No. PCT/JP2021/023861, mailed on Sep. 14, 2021.

(Continued)

*Primary Examiner* — Randy A Flynn (57) ABSTRACT

A re-multiplexing apparatus, a broadcasting system, a re-multiplexing method, and a program capable of, when broadcast data having a first resolution and broadcast data having a second resolution are broadcasted, synchronizing their outputs with each other are provided. A re-multiplexing apparatus includes a first re-multiplexing unit and a second re-multiplexing unit. The second re-multiplexing unit inserts a delay control packet at a timing corresponding to a timing of a first packet of an OFDM frame, the delay control packet being a packet containing control information for compensating for a difference between delay times of the first and second lines. When doing so, the second re-multiplexing unit generates, as the control information, an index value of a waiting time from a time when the delay control packet is received in a transmitting apparatus to a start of a modulation process for a packet following the delay control packet.

7 Claims, 7 Drawing Sheets

(56) References Cited

OTHER PUBLICATIONS

Noriyuki Shirai et al., "SFN Field Experiment Using IP Multiplexing Scheme for Next-generation Terrestrial Broadcasting System", Proceedings of the 2018 LTE Annual Convention, Aug. 15, 2018, pp. 1-2, 33D-5.

* cited by examiner

RE-MULTIPLEXING APPARATUS, BROADCASTING SYSTEM, RE-MULTIPLEXING METHOD, AND NON-TRANSITORY COMPUTER READABLE MEDIUM STORING PROGRAM

This application is a National Stage Entry of PCT/JP2021/023861 filed on Jun. 23, 2021, which claims priority from Japanese Patent Application 2020-116182 filed on Jul. 6, 2020, the contents of all of which are incorporated herein by reference, in their entirety.

TECHNICAL FIELD

The present invention relates to a re-multiplexing apparatus, a broadcasting system, a re-multiplexing method, and a program.

BACKGROUND ART

In ARIB STD-B31, which is a standard for 2K broadcasting, as a synchronization method for an SFN (Single Frequency Network), master/slave synchronization and reference synchronization are generally proposed. However, master/slave synchronization is used in most of the actual operations.

It should be noted that, regarding 4K broadcasting, 4K broadcasting using a satellite(s) has been commercialized prior to terrestrial one in Japan. In this broadcasting, a type of line used to transmit data from a studio to a transmission station is different from the line used for 2K broadcasting. Specifically, an IP (Internet Protocol) network, rather than the existing line through which MPEG-2 TS (Transport Stream) is transmitted, is used. The delay time of transmission through the existing line through which the TS is transmitted is a fixed (i.e., unchanged). In contrast, in the IP network, the delay time of transmission varies by a certain amount due to changes in a transfer path or variations in load. Therefore, when data for 4K broadcasting is transmitted through an IP network while data for 2K broadcasting is transmitted from a studio to a transmission station through the existing transmission path for 2K broadcasting, the existing master/slave synchronization using the fixed delay cannot achieve synchronization of the SFN.

As a related technology, a technology disclosed in Patent Literature 1 has been known. In this literature, an output timing is determined by specifying the timing of the start of a frame by using an absolute standard time (such as NTP (Network Time Protocol) information).

CITATION LIST

Patent Literature

Patent Literature 1: Japanese Unexamined Patent Application Publication No. 2018-191149

SUMMARY OF INVENTION

Technical Problem

The synchronization method described in Patent Literature 1 is reference synchronization using an absolute standard time, and hence cannot be easily applied to an existing system in which master/slave synchronization is performed.

The present disclosure has been made to solve the above-described problem, and an object thereof is to provide a re-multiplexing apparatus, a broadcasting system, a re-multiplexing method, and a program capable of, when broadcast data having a first resolution and broadcast data having a second resolution are broadcasted, synchronizing their outputs with each other.

Solution to Problem

A re-multiplexing apparatus according to a first aspect of the present disclosure includes:
first re-multiplexing means for performing a re-multiplexing process for input broadcast data having a first resolution in order to output the broadcast data having the first resolution from at least one transmitting apparatus as an OFDM (Orthogonal Frequency Division Multiplexing)-modulated wave, and outputting first transmission data generated by the re-multiplexing process to the transmitting apparatus through a first line; and
second re-multiplexing means for performing a re-multiplexing process for input broadcast data having a second resolution in order to output, together with the broadcast data having the first resolution, the broadcast data having the second resolution from the transmitting apparatus as the OFDM-modulated wave, and outputting second transmission data generated by the re-multiplexing process to the transmitting apparatus through a second line, in which
the second re-multiplexing means inserts a delay control packet at a timing corresponding to a timing of a first packet of an OFDM frame set by the first re-multiplexing means, the delay control packet being a packet containing control information for compensating for a difference between delay times of the first and second lines, and
the second re-multiplexing means generates, as the control information, an index value of a waiting time from a time when the delay control packet is received in the transmitting apparatus to a start of a modulation process for a packet following the delay control packet.

A broadcasting system according to a second aspect of the present disclosure includes:
a re-multiplexing apparatus; and
at least one transmitting apparatus configured to output data received from the re-multiplexing apparatus as an OFDM-modulated wave, in which
the re-multiplexing apparatus includes:
first re-multiplexing means for performing a re-multiplexing process for input broadcast data having a first resolution in order to output the broadcast data having the first resolution from the transmitting apparatus as an OFDM-modulated wave, and outputting first transmission data generated by the re-multiplexing process to the transmitting apparatus through a first line; and
second re-multiplexing means for performing a re-multiplexing process for input broadcast data having a second resolution in order to output, together with the broadcast data having the first resolution, the broadcast data having the second resolution from the transmitting apparatus as the OFDM-modulated wave, and outputting second transmission data generated by the re-multiplexing process to the transmitting apparatus through a second line,
the second re-multiplexing means inserts a delay control packet at a timing corresponding to a timing of a first packet of an OFDM frame set by the first re-multiplexing means, the delay control packet being a packet containing control information for compensating for a difference between delay times of the first and second lines, the second re-multiplexing means generates, as the control information, an index value of a waiting time from a time when the delay control packet is received in the transmitting apparatus to a start of a modulation process for a packet following the delay control packet, and the transmitting apparatus includes:

delay correction means for adjusting a timing for starting the modulation process for the packet following the delay control packet based on the control information; and modulation processing means for modulating the broadcast data having the first resolution and the broadcast data having the second resolution, and outputting these modulated broadcast data as an OFDM-modulated wave.

A re-multiplexing method according to a third aspect of the present disclosure includes:

performing a re-multiplexing process for input broadcast data having a first resolution in order to output the broadcast data having the first resolution from at least one transmitting apparatus as an OFDM-modulated wave, and outputting first transmission data generated by the re-multiplexing process to the transmitting apparatus through a first line; and performing a re-multiplexing process for input broadcast data having a second resolution in order to output, together with the broadcast data having the first resolution, the broadcast data having the second resolution from the transmitting apparatus as the OFDM-modulated wave, and outputting second transmission data generated by the re-multiplexing process to the transmitting apparatus through a second line, in which in the re-multiplexing process for the broadcast data having the second resolution, a delay control packet is generated, the delay control packet being a packet containing control information for compensating for a difference between delay times of the first and second lines, the delay control packet is inserted at a timing corresponding to a timing of a first packet of an OFDM frame set in the re-multiplexing process for the broadcast data having the first resolution, and in the generation of the delay control packet, an index value of a waiting time from a time when the delay control packet is received in the transmitting apparatus to a start of a modulation process for a packet following the delay control packet is generated as the control information.

A program according to a fourth aspect of the present disclosure causes a computer to perform:

a first re-multiplexing step of performing a re-multiplexing process for input broadcast data having a first resolution in order to output the broadcast data having the first resolution from at least one transmitting apparatus as an OFDM-modulated wave, and outputting first transmission data generated by the re-multiplexing process to the transmitting apparatus through a first line; and a second re-multiplexing step of performing a re-multiplexing process for input broadcast data having a second resolution in order to output, together with the broadcast data having the first resolution, the broadcast data having the second resolution from the transmitting apparatus as the OFDM-modulated wave, and outputting second transmission data generated by the re-multiplexing process to the transmitting apparatus through a second line, in which in the second re-multiplexing step, a delay control packet is inserted at a timing corresponding to a timing of a first packet of an OFDM frame set in the first re-multiplexing step, the delay control packet being a packet containing control information for compensating for a difference between delay times of the first and second lines, and in the second re-multiplexing step, an index value of a waiting time from a time when the delay control packet is received in the transmitting apparatus to a start of a modulation process for a packet following the delay control packet is generated as the control information.

Advantageous Effects of Invention

According to the present disclosure, it is possible to provide a re-multiplexing apparatus, a broadcasting system, a re-multiplexing method, and a program capable of, when broadcast data having a first resolution and broadcast data having a second resolution are broadcasted, synchronizing their outputs with each other.

EXAMPLE EMBODIMENT

An example embodiment according to the present invention will be described hereinafter with reference to the drawings.

First Example Embodiment

Figure 1:
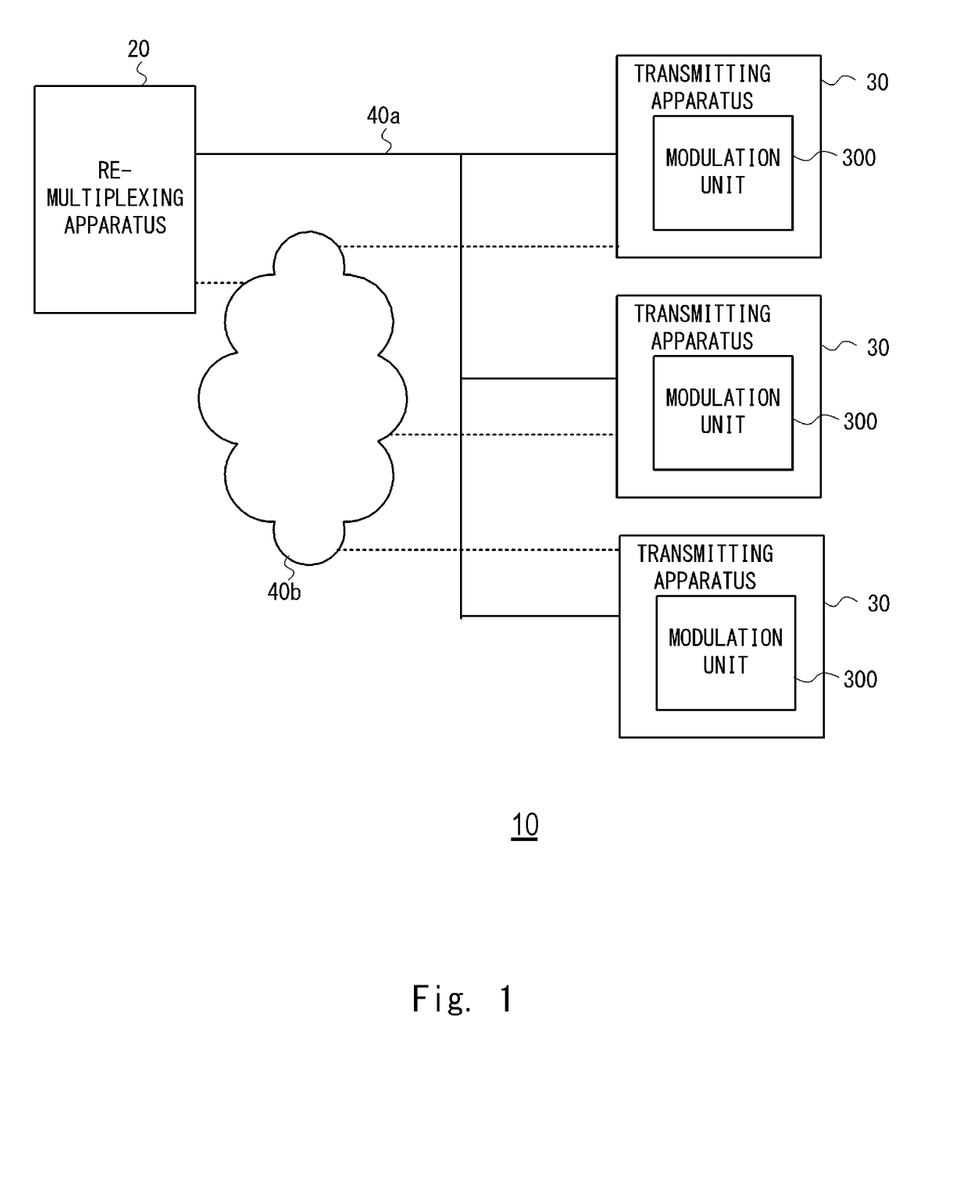
FIG. 1 is a schematic diagram showing an example of a configuration of a broadcasting system according to a first example embodiment.

FIG. 1 is a schematic diagram showing an example of a configuration of a broadcasting system 10 according to a first example embodiment. As shown in FIG. 1, the broadcasting system 10 includes a re-multiplexing apparatus 20 and at least one transmitting apparatus 30. The re-multiplexing apparatus 20 is, for example, an apparatus installed in a studio and the transmitting apparatus 30 is, for example, an apparatus installed in a transmission station. In the broadcasting system 10, broadcast data is transmitted from the re-multiplexing apparatus 20 to the transmitting apparatus 30, and then the transmitting apparatus 30 outputs broadcasting waves. Note that the broadcasting system 10 is a system that performs broadcasting through a single frequency network (SFN). That is, the at least one transmitting apparatus 30 outputs broadcasting waves by using the same frequency band (i.e., one frequency band). Further, in this example embodiment, the broadcasting system 10 outputs signals for 2K broadcasting and signals for 4K broadcasting from the transmitting apparatus 30 by using the same frequency band. The broadcasting system 10 can achieve synchronization of the SFN without using a reference signal such a PPS (Pulse Per Second) signal of a Global Positioning System (GPS). That is, the broadcasting system 10 is a broadcasting system that performs master/slave synchronization, rather than reference synchronization.

Note that "2K" is a general term for video images of which the screen resolution is full high-definition. That is, "2K" is a general term for video images of which the resolution is about 2,000 (horizontal)×1,000 (vertical). The screen resolution of 2K is, for example, 2,048 (horizontal)× 1,080 (vertical), 1,920 (horizontal)×1,080 (vertical), 2,048 (horizontal)×1,152 (vertical), 2,560 (horizontal)×1,600 (vertical), or 1,440 (horizontal)×1,080 (vertical). Further, "4K" is a general term for video images of which the screen resolution is four times that of full high-definition. That is, "4K" is a general term for video images of which the screen resolution is about 4,000 (horizontal)×2,000 (vertical). The screen resolution of 4K is, for example, 4,096 (horizontal)× 2,160 (vertical), 3,840 (horizontal)×2,160 (vertical), 4,096 (horizontal)×2,304 (vertical), or 4,096 (horizontal)×2,048 (vertical).

Broadcast data for 2K broadcasting and broadcast data for 4K broadcasting, which should be transmitted from the transmitting apparatus 30 simultaneously with the transmission of the broadcast data for 2K broadcasting by using the same frequency band, are input to the re-multiplexing apparatus 20. These broadcast data are input to the re-multiplexing apparatus 20 from, for example, an apparatus installed in a studio in which the re-multiplexing apparatus 20 is provided through an optical line, a coaxial cable, or the like. The re-multiplexing apparatus 20 preforms a re-multiplexing process (which will be described later) for these broadcast data and outputs the data, for which the re-multiplexing process has been performed, to each transmitting apparatus 30.

Each transmitting apparatus 30 makes (i.e., instructs) its modulation unit 300 perform OFDM modulation on the data received from the re-multiplexing apparatus 20, and outputs the resultant received data as OFDM-modulated waves. Note that each transmitting apparatus 30 synchronizes the output timing from that transmitting apparatus 30 by adjusting the start timing of the modulation process. That is, each transmitting apparatus 30 achieves the synchronization of SFN. In this example embodiment, since a signal for 2K broadcasting and a signal for 4K broadcasting are simultaneously output as OFDM-modulated waves, it is necessary to, in addition to synchronizing the output timings of a plurality of transmitting apparatuses 30 with each other, adjust the start timing of the modulation process for the data for 2K broadcasting and that for the data for 4K broadcasting. To this end, the re-multiplexing apparatus 20 inserts a packet (hereafter also referred to as a timing packet or a delay control packet) for controlling the above-described timing in a string of packets which is transmitted from the re-multiplexing apparatus 20 to the transmitting apparatus 30.

In the broadcasting system 10, the data for 2K broadcasting and the data for 4K broadcasting are transmitted from the re-multiplexing apparatus 20 to each transmitting apparatus 30 through respective separate lines. In this example embodiment, the data for 2K broadcasting is transmitted through a microwave line 40a in a one-to-one manner, and the data for 4K broadcasting is transmitted through an IP network 40b. In FIG. 1, the transmission path for the data for 2K broadcasting is indicated by solid lines, and the transmission path for the data for 4K broadcasting is indicated by dashed lines. Note that, as an example, the data for 2K broadcasting is wirelessly transmitted from the re-multiplexing apparatus 20 to the transmitting apparatus 30, and the data for 4K broadcasting is transmitted from the re-multiplexing apparatus 20 to the transmitting apparatus 30 through a cable(s). However, these transmissions are not limited to the wireless transmission or to the wired transmission. Further, transmission from the re-multiplexing apparatus 20 to the transmitting apparatus 30 through the microwave line 40a may be performed through a relay apparatus (not shown).

Note that the delay time of the transmission through the microwave line 40a is fixed (i.e., unchanged). That is, the delay time of the transmission from the re-multiplexing apparatus 20 to a given transmitting apparatus 30 is fixed at a delay time A, and the delay time of the transmission from the re-multiplexing apparatus 20 to another transmitting apparatus 30 is fixed at a delay time B. Note that, in general, the delay times A and B are different from each other. In contrast, the delay time of the transmission from the re-multiplexing apparatus 20 to a given transmitting apparatus 30 through the IP network 40b varies within a certain variation range. Further, in general, the delay time of the transmission of data for 4K broadcasting through the IP network 40b is shorter than the delay time of the transmission of data for 2K broadcasting through the microwave line 40a.

Figure 2:
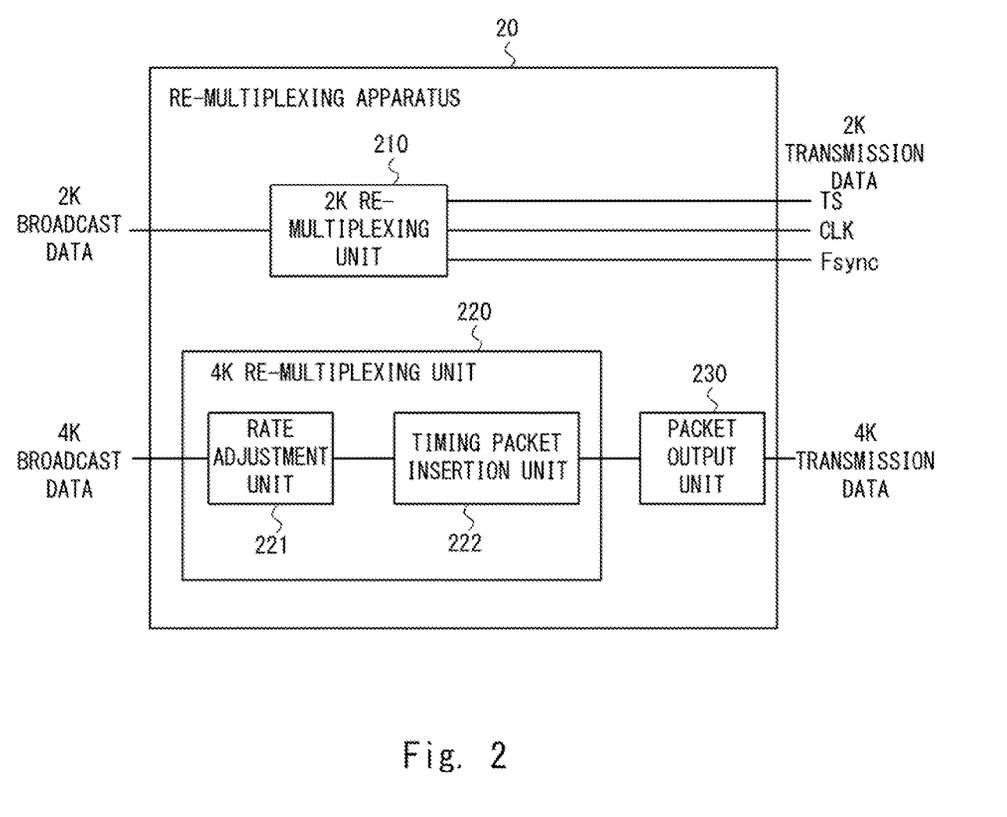
FIG. 2 is a block diagram showing an example of a configuration of a re-multiplexing apparatus according to the first example embodiment.

Next, a configuration of the re-multiplexing apparatus 20 will be described. FIG. 2 is a block diagram showing an example of a configuration of the re-multiplexing apparatus 20 according to the first example embodiment. As shown in FIG. 2, the re-multiplexing apparatus 20 includes, as main components, a 2K re-multiplexing unit 210, a 4K re-multiplexing unit 220, and a packet output unit 230. The 2K re-multiplexing unit 210 performs a re-multiplexing process for input 2K broadcast data in order to output the 2K broadcast data from at least one transmitting apparatus 30 as OFDM-modulated waves. In this way, first transmission data (2K transmission data) generated by the above-described re-multiplexing process is output to the transmitting apparatus 30 through the microwave line 40a. Further, the 4K re-multiplexing unit 220 performs a re-multiplexing process for input 4K broadcast data in order to output the 4K broadcast data, together with the 2K broadcast data, from the transmitting apparatus 30 as OFDM-modulated waves. In this way, second transmission data (4K transmission data) generated by the above-described re-multiplexing process is output to the transmitting apparatus 30 through the IP network 40b.

Data for 2K broadcasting is input to the 2K re-multiplexing unit 210. This data is a TS packet(s) standardized according to MPEG-2. Similarly, data for 4K broadcasting is input to the 4K re-multiplexing unit 220. This data is, for example, a TS packet(s), but may instead be a TLV (Type Length Value) packet(s). Each of the data input to the 2K re-multiplexing unit 210 and the data input to the 4K re-multiplexing unit 220 is, for example, data in which a video image, a sound, and the like are multiplexed.

The 2K re-multiplexing unit 210 is a processing unit that performs a well-known re-multiplexing process. The 2K re-multiplexing unit 210 determines a data rate at which data is input to the transmitting apparatus 30 based on predetermined parameter values of modulation parameters (e.g., a multi-level number, a coding rate, and the like) of primary modulation performed for data for 2K broadcasting in the transmitting apparatus 30. Then, the 2K re-multiplexing unit 210 inserts a null (Null) packet(s), which is a packet(s) containing null (Null) data, in the data that is input to the 2K re-multiplexing unit 210 so that broadcast data is output from the 2K re-multiplexing unit 210 at the determined data rate. That is, the 2K re-multiplexing unit 210 outputs a transport stream (TS) at a predetermined data rate that is specified (i.e., determined) based on the modulation parameters.

Further, the 2K re-multiplexing unit 210 outputs, in addition to the transport stream containing data of a video image, a sound, and the like, a processing clock (CLK) and a frame synchronization signal (Fsync) to the transmitting apparatus 30. These data and signal are received by the transmitting apparatus 30 through the microwave line 40a. Note that the output of the TS, the CLK, and the Fsync by the 2K re-multiplexing unit 210 is a well-known technology, and therefore detailed descriptions thereof are omitted. The processing clock (CLK) is the same as the clock used in the processing performed in the re-multiplexing apparatus 20, and the transmitting apparatus 30 performs the processing according to the processing clock received from the re-multiplexing apparatus 20. Further, the frame synchronization signal (Fsync) is a signal that is synchronized with the cycle (i.e., the period) of the OFDM frame (the frame length of the OFDM frame), and indicates the start of a group of data (a group of packets) that constitutes one OFDM frame. Note that the cycle of the OFDM frame is uniquely specified by modulation parameters (a mode and a guard interval) of the OFDM modulation. As descried above, it can be said that the 2K re-multiplexing unit 210 sets the timing of the first packet of each OFDM frame formed in the transmitting apparatus 30.

Further, the 2K re-multiplexing unit 210 multiplexes an IIP (ISDB-T Information Packet) including TMCC (Transmission and Multiplexing Configuration Control) information and the like on the TS as in the case of a well-known re-multiplexing unit. More specifically, the 2K re-multiplexing unit 210 multiplexes an IIP on the TS at each cycle of the frame synchronization signal (Fsync), i.e., at each cycle of the OFDM frame. The TMCC information is information containing parameters such as modulation parameters that specify the modulation performed in the transmitting apparatus 30. Note that the TMCC information multiplexed by the 2K re-multiplexing unit 210 contains a TMCC_synchronization_word specified in ARIB STD-B31. The value of the TMCC_synchronization_word is set to either a first value W0 or a second value W1. The 2K re-multiplexing unit 210 multiplexes the IIP on the TS at each cycle of the frame synchronization signal (Fsync), i.e., at each cycle of the OFDM frame while switching the value of the TMCC_synchronization_word. Therefore, the 2K re-multiplexing unit 210 alternately outputs the first value W0 and the second value W1 at each cycle of the frame synchronization signal (Fsync). As described above, it can be said that the parameter TMCC_synchronization_word is information indicating whether the OFDM frame, which is composed of the group of data (hereinafter also referred to as a data group) in which this parameter is multiplexed, is an odd-numbered frame or an even-numbered frame. Alternatively, it can be said that the parameter TMCC_synchronization_word is information indicating whether the data group (the packet group) in which the aforementioned parameter is multiplexed is an odd-numbered data group or an even-numbered data group.

Further, a continuity counter, which is used in an MPEG-2 transport stream, is contained in the IIP packet. Therefore, the 2K re-multiplexing unit 210 multiplexes the value of the continuity_counter on the TS and outputs the resultant TS at each cycle of the frame synchronization signal (Fsync), i.e., at each cycle of the OFDM frame. The continuity_counter is a parameter with which TS packets to be transmitted are sequentially counted, and is a parameter contained in the TS packet. For example, it is stored in the IIP packet that the value of the continuity_counter of the first TS packet included in the TS packet group on which this IIP packet is multiplexed. The value of the continuity_counter contained in the IIP packet, which is output from the 2K re-multiplexing unit 210 at each cycle of the frame synchronization signal (Fsync), changes at each cycle of the frame synchronization signal (Fsync).

As described above, the 2K re-multiplexing unit 210 generates a transport stream by multiplexing the parameter values of the predetermined parameters on 2K broadcast data at each cycle of the OFDM frame.

Next, the 4K re-multiplexing unit 220 will be described. As shown in FIG. 2, the 4K re-multiplexing unit 220 includes a rate adjustment unit 221 and a timing packet insertion unit 222.

The rate adjustment unit 221 determines a data rate at which data is input to the transmitting apparatus 30 based on predetermined parameter values of modulation parameters of primary modulation performed for data for 2K broadcasting in the transmitting apparatus 30 and predetermined parameter values of modulation parameters of primary modulation performed for data for 4K broadcasting. In this example embodiment, the broadcasting system 10 outputs data for 2K broadcasting and data for 4K broadcasting from the transmitting apparatus 30 as OFDM-modulated waves using the same frequency band. Therefore, the transmission capacity is shared between the transmission of data for 2K broadcasting and the transmission of data for 4K broadcasting. Note that, in this example embodiment, the transmission of data for 4K broadcasting is performed by using an available capacity of the transmission capacity, i.e., the remaining capacity of the transmission capacity after allocating a part of the transmission capacity to the transmission of data for 2K broadcasting. Therefore, the rate adjustment unit 221 determines the data rate for data for 4K broadcasting based on, in addition to the modulation parameter values of the primary modulation performed for data for 4K broadcasting, the modulation parameter values of the primary modulation performed for data for 2K broadcasting. Then, the rate adjustment unit 221 inserts a null (Null) packet(s), which is a packet containing null (Null) data, into the data that is input to the rate adjustment unit 221 so that the broadcast data is output from the 4K re-multiplexing unit 220 at the determined data rate. That is, the rate adjustment unit 221 outputs data at a predetermined data rate that is specified (i.e., determined) based on the modulation parameters.

The timing packet insertion unit 222 generates a timing packet (also referred to as a delay control packet) and inserts the generated timing packet in a string of data output from the rate adjustment unit 221. The timing packet is a packet containing control information for compensating for a difference between a delay time of transmission through a line through which data for 2K broadcasting is transmitted and a delay time of transmission through a line through which data for 4K broadcasting is transmitted. In other words, the timing packet is a packet containing control information for compensating for a difference between the transmission delay of the microwave line 40*a* between the re-multiplexing apparatus 20 and the transmitting apparatus 30 and the transmission delay of the IP network 40*b* between the re-multiplexing apparatus 20 and the transmitting apparatus 30. The control information is generated for each transmitting apparatus 30 by the timing packet insertion unit 222.

The timing packet insertion unit 222 inserts a timing packet at a timing corresponding to the timing of the first packet of the OFDM frame. That is, the timing packet insertion unit 222 inserts the timing packet at a position corresponding to the position of the first packet. Specifically, the timing packet insertion unit 222 inserts the timing packet immediately before the packet of the 4K broadcast data, corresponding to the first packet. Note that the timing packet insertion unit 222 replaces the packet immediately before the packet of the 4K broadcast data, corresponding to the first packet (i.e., the packet just before the packet of the 4K broadcast data, corresponding to the first packet) with the timing packet. Therefore, the packet that is replaced by the timing packet is lost. Because of this, the rate adjustment unit 221 uses a Null packet for the packet at the position at which the packet is replaced.

Note that the control information stored in the timing packet includes an index value of a waiting time (a delay time) that is used when a 4K delay correction unit 310 (which will be described later) of the transmitting apparatus 30 delays the start of the subsequent modulation process in order to compensate for a delay. More specifically, the control information includes an index value of a waiting time from a time when the timing packet is received in the transmitting apparatus 30 to the start of the modulation process for the packet following the timing packet. The timing packet insertion unit 222 specifies (i.e., determines) this index value, which is designated as the control information, based on 2K transmission path delay information, 4K transmission path delay information, and the cycle (i.e., the period) of the OFDM frame. The 2K transmission path delay information is a delay time, for each transmitting apparatus 30, of the microwave line 40*a* used for transmission between the re-multiplexing apparatus 20 and that transmitting apparatus 30. This delay time is a fixed delay time which is measured in advance. Further, the 4K transmission delay information is a delay time, for each transmitting apparatus 30, of the IP network 40*b* used for transmission between the re-multiplexing apparatus 20 and that transmitting apparatus 30. This delay time is a time that is set based on the result of measurement carried out beforehand. As described above, the delay time of the IP network 40*b* varies. Therefore, as the 4K transmission delay information, for example, the minimum delay time obtained as a result of measurement may be set, or an average delay time may be set.

As described above, the control information is generated for each transmitting apparatus 30. The generation of control information for a given transmitting apparatus 30 will be described hereinafter. In the following description, this transmitting apparatus 30 is referred to as a transmitting apparatus A. It is assumed that the delay time for the transmitting apparatus A indicated by the 4K transmission path delay information is 50 milliseconds, and the delay time for the transmitting apparatus A indicated by the 2K transmission path delay information is 300 milliseconds. Further, it is assumed that the cycle (i.e., the period) of the OFDM frame is 231.336 milliseconds. In this case, the transmitting apparatus A receives the 2K broadcast data 250 milliseconds later than the 4K broadcast data. The difference of the delay times, which is 250 milliseconds, is equal to or longer than a time equivalent to one cycle of the OFDM frame and shorter than a time equivalent to two cycles thereof. In this case, the first packet of the 2K broadcast data which the transmitting apparatus A receives after it has received the timing packet for 4K broadcast data and waited a time equivalent to one cycle becomes a packet that is temporally synchronized with the packet immediately after the timing packet. Therefore, in this case, the timing packet insertion unit 222 sets, for example, the index value for the transmitting apparatus A to "1" and transmits the set index value to the transmitting apparatus A so that the transmitting apparatus A can specify (i.e., find out) at which timing the first packet, to which the packet immediately after the timing packet corresponds, was received in the transmitting apparatus A. In this way, when the difference between the delay times of the two transmission paths for the transmitting apparatus A is equal to or longer than a time corresponding to N cycles (N is an integer) of the OFDM frame and shorter than a time corresponding to N+1 cycles thereof, the timing packet insertion unit 222 sets "N" as the index value for the transmitting apparatus A. Note that although the cycle (i.e., the period) is set as the index value in this example embodiment, a specific time (or a specific duration) may be set as the index value. That is, the timing packet insertion unit 222 may set the value of the difference between the delay times of the two transmission lines for the transmitting apparatus A as the index value. In this case, the timing packet insertion unit 222 may specify (i.e., determine) the index value without using the cycle of the OFDM frame. The timing packet insertion unit 222 determines the index value for each transmitting apparatus 30 as described above.

It should be noted that, as described above, the delay time of the IP network 40*b* varies. Therefore, there is a risk that when the delay compensation is performed based on the index value determined based on the set 4K transmission path delay information, the transmitting apparatus 30 could mistakenly perform the modulation process for 4K broadcast data at a timing that is deviated from the correct timing by one frame. Therefore, it is preferred that there is another reference value other than the index value. Therefore, in this example embodiment, the timing packet insertion unit 222 uses, as control information, parameter values of predetermined parameters multiplexed at each cycle of the OFDM frame by the 2K re-multiplexing unit 210. That is, in this example embodiment, the 2K re-multiplexing unit 210 generates a delay control packet containing control information containing an index value and parameter values. Specifically, the predetermined parameters used as the control information are the above-described TMCC_synchronization_word and the continuity_counter. Each of these parameter values is a value that varies at each frame cycle, and hence can be used as information to identify a frame. Therefore, by comparing the parameter values contained in the timing packet for 4K broadcast data with the parameter values of the IIP packet for 2K broadcast data in the transmitting apparatus 30, it is possible to specify the temporal correspondence between the packet of the 2K broadcast data and the packet of the 4K broadcast data more accurately in the transmitting apparatus 30. Note that, unlike the index value, the same value is set to the parameter value, which is set as the control information, for all the transmitting apparatuses 30.

Next, the packet output unit 230 will be described. The packet output unit 230 converts data output from the 4K re-multiplexing unit 220 into data in a format suitable for transmission through the IP network 40b, and outputs the converted data to the transmitting apparatus 30 through the IP network 40b. Specifically, for example, the packet output unit 230 performs a MAC (Media Access Control) flaming process, an IP (Internet Protocol) framing process, and a UDP (User Datagram Protocol) framing process for data output from the 4K re-multiplexing unit 220.

Figure 3A:
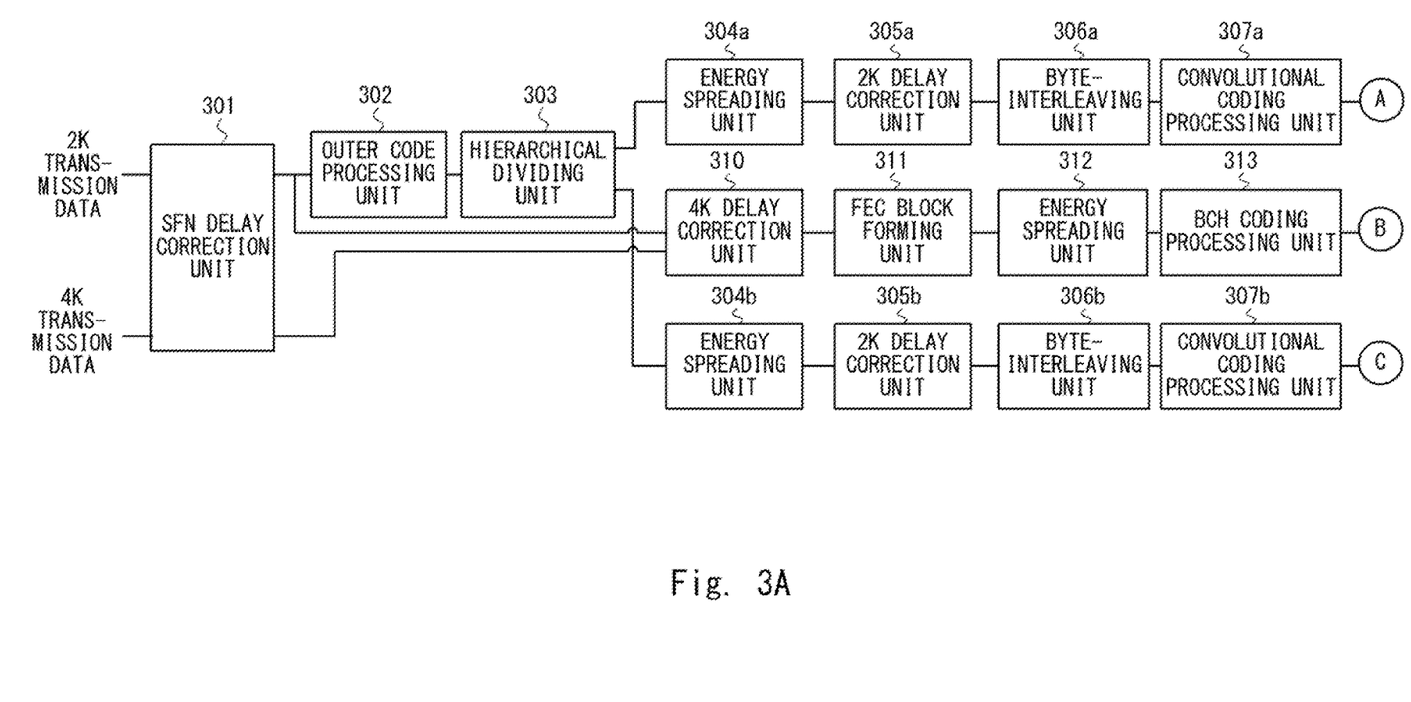
FIG. 3A is a block diagram showing an example of a configuration of a modulation unit.
Figure 3B:
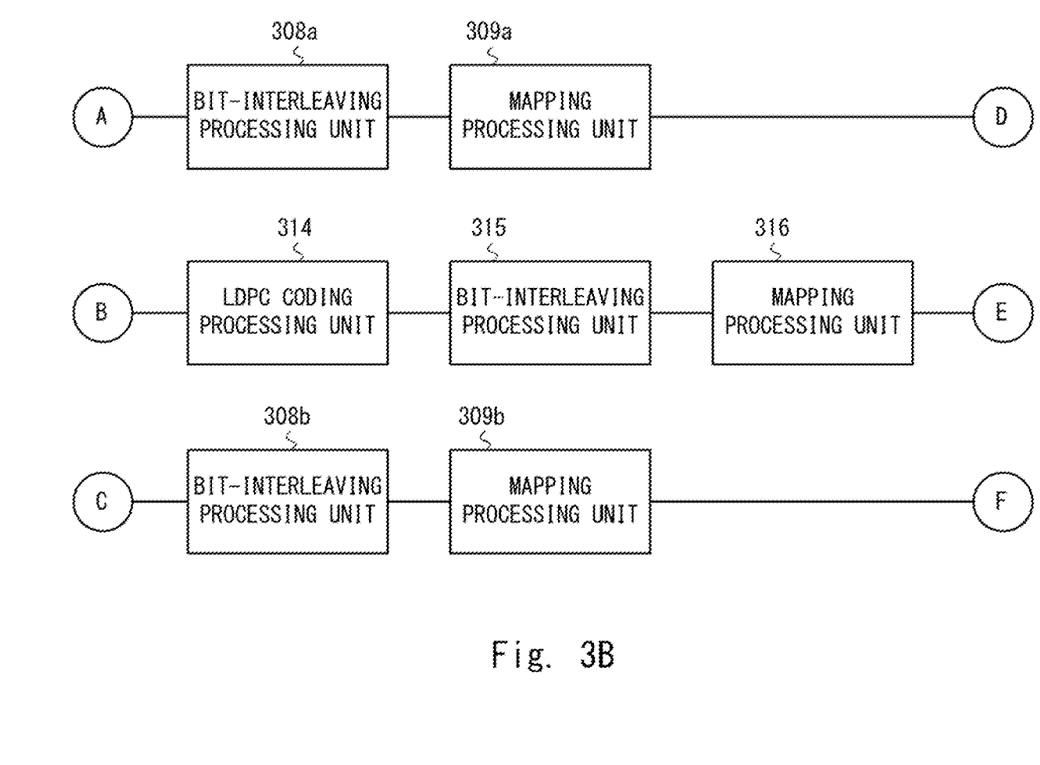
FIG. 3B is a block diagram showing an example of a configuration of a modulation unit.
Figure 3C:
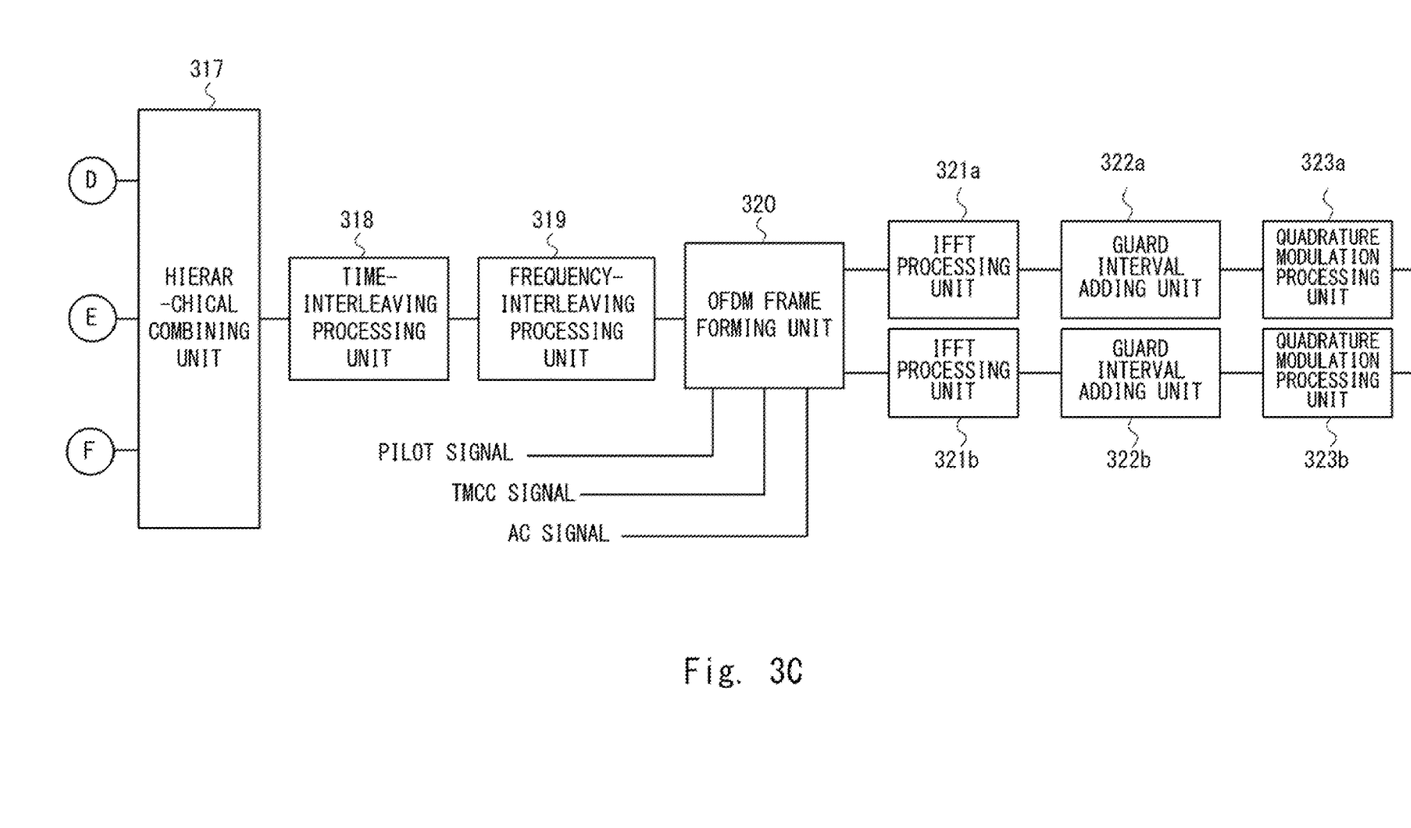
FIG. 3C is a block diagram showing an example of a configuration of a modulation unit.

Next, the modulation unit 300 of the transmitting apparatus 30 will be described. FIGS. 3A to 3C are block diagrams showing an example of a configuration of the modulation unit 300. As shown in FIGS. 3A to 3C, the modulation unit 300 includes an SFN delay correction unit 301, an outer code processing unit 302, a hierarchical dividing unit 303, energy spreading units 304a and 304b, 2K delay correction units 305a and 305b, byte-interleaving units 306a and 306b, convolutional coding processing units 307a and 307b, bit-interleaving processing units 308a and 308b, mapping processing units 309a and 309b, a 4K delay correction unit 310, an FEC block forming unit 311, an energy spreading unit 312, a BCH coding processing unit 313, an LDPC coding processing unit 314, a bit-interleaving processing unit 315, a mapping processing unit 316, a hierarchical combining unit 317, a time-interleaving processing unit 318, a frequency-interleaving processing unit 319, an OFDM frame forming unit 320, IFFT processing units 321a and 321b, guard interval adding units 322a and 322b, and quadrature modulation processing units 323a and 323b. These components perform processes according to a processing clock (CLK) received from the re-multiplexing apparatus 20. Each of the components of the modulation unit 300 will be described hereinafter. Note that FIGS. 3A to 3C show the configuration of the modulation unit 300 in the case where hierarchical transmission is performed. More specifically, it is assumed that, in the transmission of 2K broadcast data using the microwave line 40a, data in two layers (i.e., at two levels) are transmitted.

2K broadcast data and a frame synchronization signal (Fsync) transmitted from the transmitting apparatus 30 to the re-multiplexing apparatus 20 through the microwave line 40a, and 4K broadcast data transmitted from the transmitting apparatus 30 to the re-multiplexing apparatus 20 through the IP network 40b are input to the SFN delay correction unit 301.

The SFN delay correction unit 301 performs a correction process for compensating for the difference between the transmission delays of transmitting apparatuses 30. Specifically, the SFN delay correction unit 301 temporarily holds input data for a predetermined waiting time, and then outputs the data to the subsequent processing block. That is, the SFN delay correction unit 301 performs a process for delaying the start of the subsequent process by a predetermined waiting time. Note that this waiting time is set in advance based on, for example, the maximum transmission delay time among the transmission delay times of the transmitting apparatuses 30 in the transmission from the re-multiplexing apparatus 20 to the transmitting apparatuses 30.

The 2K broadcast data, for which the delay correction has been performed by the SFN delay correction unit 301, is input to the outer code processing unit 302 and the 4K delay correction unit 310. Further, the 4K broadcast data, for which the delay correction has been performed by the SFN delay correction unit 301, is input to the 4K delay correction unit 310.

The above-described data in the two layers are input to the outer code processing unit 302. Then, the outer code processing unit 302 performs a process for adding a predetermined checking code to the input data. In this example, the outer code processing unit 302 adds a Reed-Solomon code (RS (204, 188)) to the input data. Then, the outer code processing unit 302 outputs the data, to which the checking code has been added, to the hierarchical dividing unit 303.

The hierarchical dividing unit 303 divides the data in the two layers into two pieces of data, and outputs one piece of data to the energy spreading unit 304a and the other piece of data to the energy spreading unit 304b.

The energy spreading unit 304a performs a predetermined energy spreading process on data output from the hierarchical dividing unit 303 and outputs the processing result to the 2K delay correction unit 305a. Similarly, the energy spreading unit 304b performs a predetermined energy spreading process on the data output from the hierarchical dividing unit 303 and outputs the processing result to the 2K delay correction unit 305b.

Each of the 2K delay correction units 305a and 305b performs delay compensation for compensating for the difference between a processing time from the energy spreading unit 304a to the mapping processing unit 309a and a processing time from the energy spreading unit 304b to the mapping processing unit 309b. That is, each of the 2K delay correction units 305a and 305b performs a process for delaying the start of the subsequent process by a predetermined waiting time so that the end timings of the subsequent processes coincide with each other.

After the processing by the 2K delay correction units 305a and 305b, the processing by the byte-interleaving units 306a and 306b is performed. Each of the byte-interleaving units 306a and 306b performs a byte-interleaving process by which data is re-arranged on a byte-by-byte basis. Note that the depth of the interleaving is, for example, 12 bytes.

Each of the convolutional coding processing units 307a and 307b performs a predetermined convolutional encoding process on a respective one of the bit-streams, for which the convolutional byte-interleaving processes have been performed by the byte-interleaving units 306a and 306b, respectively. Specifically, each of the convolutional coding processing units a and b performs a coding process using a punctured convolutional code on a respective one of the bit-streams with a coding rate set for each layer under conditions that, for example, a constraint length k is seven (k=7) and an original code of a coding rate of ½ is used as a mother code.

Each of the bit-interleaving processing units 308a and 308b performs a bit-interleaving process on a respective one of the bit-streams, for which the coding processes have been performed by the convolutional coding processing units 307a and 307b, according to the mapping which will be performed in a respective one of the subsequent mapping processing units 309a and 309b.

Each of the mapping processing units 309a and 309b performs a mapping process on a respective one of the bit-streams, for which the bit-interleaving processes have been performed by the bit-interleaving processing units 308a and 308b. Specifically, the mapping processing unit 309a performs, for example, a QPSK (Quadrature Phase Shift Keying) mapping process on the bit-stream, for which the bit-interleaving processing unit 308a has performed the bit-interleaving process. Further, the mapping processing unit 309b performs, for example, a 64 QAM (Quadrature Amplitude Modulation) mapping process on the bit-stream, for which the bit-interleaving processing unit 308b has performed the bit-interleaving process. Then, the mapping processing units 309a and 309b output signals, on which the bit-streams have been mapped, to the hierarchical combining unit 317.

Based on the timing packet inserted by the re-multiplexing apparatus 20, the 4K delay correction unit 310 performs a correction process for compensating for the difference between the transmission delay of the transmission from the re-multiplexing apparatus 20 to the transmitting apparatus 30 through the microwave line 40a and the transmission delay of the transmission through the IP network 40b. Specifically, the 4K delay correction unit 310 adjusts the start timing of the subsequent process for the packet following the timing packet based on the control information contained in the timing packet. In this example embodiment, the 4K delay correction unit 310 adjusts the timing at which the subsequent process starts by referring to the index value and the parameter values contained in the control information (which will be described later). However, the 4K delay correction unit 310 may adjust the timing at which the subsequent process starts without referring to the parameter values. In this case, the control information may not contain the parameter values. Further, the 4K delay correction unit 310 may adjust the timing at which the subsequent process starts by referring only one of the two parameter values, i.e., one of the TMCC_synchronization_word and the continuity_counter.

When the timing packet is received (i.e., when the timing packet is input to the 4K delay correction unit 310), the 4K delay correction unit 310 refers to the index value. As described above, this index value is information indicating how much the difference between the delay time of the microwave line 40a and that of the IP network 40b is. For example, when the value of this index value is N (cycles), the 4K delay correction unit 310 can detect (i.e., find out) that the difference between the delay time of the microwave line 40a and that of the IP network 40b in the transmitting apparatus 30 is equal to or longer than a time equivalent to N cycles of the OFDM frame and shorter than a time equivalent to N+1 cycles thereof. That is, it is possible to detect (i.e., find out) that the first packet of the first received frame of 2K broadcast data after the timing packet has been input to the 4K delay correction unit 310 and a time equivalent to N cycles has elapsed is a packet that is temporally synchronized with the packet immediately after the aforementioned timing packet. Note that the first packet of a frame of 2K broadcast data is specified by having (i.e., instructing) the 4K delay correction unit 310 monitor the frame synchronization signal (Fsync). Note that the 4K delay correction unit 310 may specify the first packet of a frame in 2K broadcast data by, instead of monitoring the frame synchronization signal (Fsync), referring to an IIP packet contained in the 2K broadcast data. This is because since the IIP packet contains information indicating how many packets behind the IIP packet the first packet is located, it is possible to specify the first packet by referring to this information. In this case, the 4K delay correction unit 310 does not have to monitor the frame synchronization signal (Fsync).

When the 4K delay correction unit 310 has specified the packet of the 2K broadcast data that is temporally synchronized with the packet immediately after the timing packet based on the index value, it checks whether this specification (i.e., the specified packet) is correct. Specifically, the 4K delay correction unit 310 compares the parameter values (the TMCC_synchronization_word and the continuity_counter) contained in the timing packet with those stored in the IIP packet corresponding to the specified packet, and thereby determines whether they match each other. When they match each other, the 4K delay correction unit 310 determines that the specification based on the index value is correct. On the other hand, when they do not match each other, the 4K delay correction unit 310 determines that the specification based on the index value is incorrect. In this case, the 4K delay correction unit 310 specifies, for example, the first packet of the next frame of the frame specified based on the index value as the packet of the 2K broadcast data that is temporally synchronized with the packet immediately after the timing packet.

When it is confirmed that the specification is correct, the 4K delay correction unit 310 temporarily holds the packet subsequent to the timing packet until a time point at which the specified first packet is input, and then outputs the data to the subsequent process block. In other words, the 4K delay correction unit 310 temporarily holds the packet subsequent to the timing packet, and after that, the 4K delay correction unit 310 make the subsequent process block to start the subsequent process. As described above, the 4K delay correction unit 310 performs a process for delaying the start of the subsequent process.

Note that the 4K delay correction unit 310 may perform a delay correction for compensating for the difference between the processing time of the modulation unit 300 for 2K broadcast data and the processing time of the modulation unit 300 for 4K broadcast data. That is, the 4K delay correction unit 310 may further delay the start of the subsequent process by a predetermined waiting time so that the end timings of the subsequent processes coincide with each other.

After the processing by the 4K delay correction unit 310, the processing by the FEC block forming unit 311 is performed. The FEC block forming unit 311 generates an FEC (Forward Error Correction) block from input packets. That is, the FEC block forming unit 311 arranges the input bit strings in a format for performing error correction coding and outputs the arranged bits to the energy spreading unit 312.

The energy spreading unit 312 performs a predetermined energy spreading process on the data output from the FEC block forming unit 311 and outputs the processing result to the BCH coding processing unit 313.

The BCH coding processing unit 313 adds a BCH (Bose-Chaudhuri-Hocquenghem) coding parity, which is an error correction outer code, to the bit string output from the energy spreading unit 312, and outputs the resultant bit string to the LDPC coding processing unit 314.

The LDPC coding processing unit 314 adds an LDPC (Low-Density Parity-Check) coding parity, which is an error correction inner code, to the bit string output from the BCH coding processing unit 313, and outputs the resultant bit string to the bit-interleaving processing unit 315.

The bit-interleaving processing unit 315 performs a bit-interleaving process according to the mapping that will be performed by the subsequent mapping processing unit 316, on the bit stream, which has been processed by the LDPC coding processing unit 314.

The mapping processing unit 316 performs a mapping process on the bit-stream, for which the bit-interleaving process has been performed by the bit-interleaving processing unit 315. Specifically, the mapping processing unit 316 performs a mapping process such as 4,096 QAM, 1,024 QAM, or 256 QAM on the bit-stream, for which the bit-interleaving processing unit 315 has performed the bit-interleaving process. Then, the mapping processing unit 316 outputs a signal on which the bit-stream has been mapped to the hierarchical combining unit 317.

The hierarchical combining unit 317 combines the signals output from the mapping processing units 309a, 309b and 316, respectively, with pre-designated parameters, inserts the resultant signal in the data segment, and performs a speed conversion as a hierarchical combining process.

In order to temporally distribute the modulated (mapping-processed) symbol data and to improve the anti-fading performance, the time-interleaving processing unit 318 performs a predetermined time-interleaving process on the signal, for which the hierarchical combining process has been performed, on a modulation-symbol basis (on an I- and Q-axis basis).

The frequency-interleaving processing unit 319 performs a frequency-interleaving process in which the frequency of the carrier (the carrier wave) is changed (changed in rotation) within a segment according to the time, and/or the frequency bands used in segments are interchanged with each other.

The signal, for which the frequency-interleaving has been performed by the frequency-interleaving processing unit 319, a pilot signal, a TMCC signal, and an AC (Auxiliary Channel) signal are input to the OFDM frame forming unit 320. Note that the pilot signal is, for example, a continuous carrier. Further, the TMCC signal is a signal generated based on TMCC information received from the re-multiplexing apparatus 20. The AC signal is, for example, an extension signal for transmitting additional information related to broadcasting.

The OFDM frame forming unit 320 forms (i.e., constructs) an OFDM frame based on the input signals. Specifically, the OFDM frame forming unit 320 sets, for example, the value of each signal to each symbol in each OFDM carrier. In the example shown in FIG. 3C, the OFDM frame forming unit 320 forms, for example, an OFDM frame for horizontal polarization and an OFDM frame for vertical polarization. Then, the OFDM frame forming unit 320 outputs, for example, the OFDM frame for horizontal polarization to the IFFT processing unit 321a. Further, the OFDM frame forming unit 320 outputs, for example, the OFDM frame for vertical polarization to the IFFT processing unit 321b.

Each of the IFFT processing units 321a and 321b performs an IFFT (Inverse Fast Fourier Transform) process on a respective one of the OFDM frames input thereto, and converts the signal in the frequency domain into a signal in the time domain. Then, the IFFT processing units 321a and 321b output the converted time-domain signals to the guard interval adding units 322a and 322b, respectively.

Each of the guard interval adding units 322a and 322b performs a guard interval process for adding data corresponding to a predetermined time (i.e., a predetermined duration) before the effective symbol in a respective one of the time-domain signals input thereto.

Each of the quadrature modulation process units 323a and 323b performs a predetermined quadrature modulation process on a respective one of the time-domain signals output from the guard interval adding units 322a and 322b. Specifically, the quadrature modulation process unit 323a performs, for example, a predetermined quadrature modulation process on the time-domain signal output from the guard interval adding unit 322a, and thereby converts the time-domain signal into a first OFDM signal having a predetermined transmitting frequency. Further, the quadrature modulation process unit 323b performs, for example, a predetermined quadrature modulation process on the time-domain signal output from the guard interval adding unit 322b, and thereby converts the time-domain signal into a second OFDM signal having a predetermined transmitting frequency. The first OFDM signal is output to a first antenna for horizontal polarization (not shown) provided in the transmitting apparatus 30, converted into electromagnetic waves by the first antenna, and emitted as horizontally-polarized waves. Further, the second OFDM signal is output to a second antenna for vertical polarization (not shown) provided in the transmitting apparatus 30, converted into electromagnetic waves by the second antenna, and emitted as vertically-polarized waves.

Note that, in the example shown in FIG. 3C, an example of the configuration of the modulation unit 300 in which transmission is performed according to the MIMO (Multiple-Input and Multiple-Output) scheme is shown. However, needless to say, transmission according to the SISO (Single-Input and Single-Output) scheme or the like may be performed.

The first example embodiment has been described above. According to this example embodiment, a timing packet for synchronizing 2K broadcast data and 4K broadcast data with each other is inserted into the 4K broadcast data by the re-multiplexing apparatus 20. Therefore, it is possible to synchronize, when 2K broadcast data and 4K broadcast data are broadcasted, their outputs with each other.

Second Example Embodiment

Figure 4:
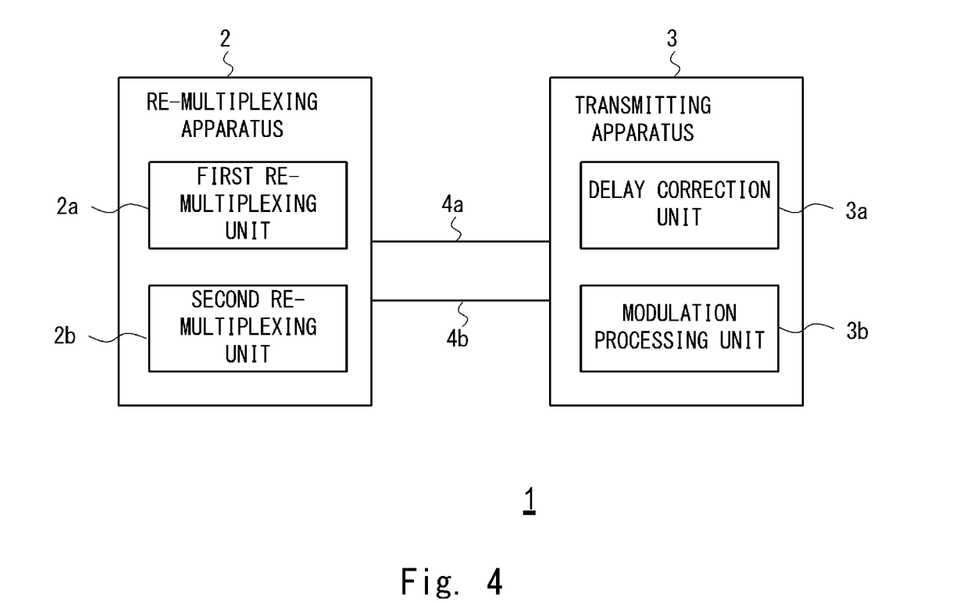
FIG. 4 is a block diagram showing a configuration of a broadcasting system according to a second example embodiment.

Next, a second example embodiment will be described. The second example embodiment is an example embodiment formed of characteristic elements of the first example embodiment. FIG. 4 is a block diagram showing a configuration of a broadcasting system 1 according to the second example embodiment. As shown in FIG. 4, the broadcasting system 1 includes a re-multiplexing apparatus 2 and a transmitting apparatus 3. Note that although only one transmitting apparatus 3 is shown in the example shown in FIG. 4, the broadcasting system 1 may include a plurality of transmitting apparatuses 3.

The re-multiplexing apparatus 2 includes a first re-multiplexing unit 2a and a second re-multiplexing unit 2b.

The first re-multiplexing unit 2a performs a re-multiplexing process for broadcast data having a first resolution, input to the first re-multiplexing unit 2a in order to output the broadcast data having the first resolution as OFDM-modulated waves from the transmitting apparatus 3. Then, the first re-multiplexing unit 2a outputs first transmission data generated by the above-described re-multiplexing process to the transmitting apparatus 3 through a first line 4a. Note that the first line 4a is, for example, a microwave line. However, the first line 4a is not limited to the microwave line and may be any of other types of lines.

Further, the second re-multiplexing unit 2b performs a re-multiplexing process for broadcast data having a second resolution, input to the second re-multiplexing unit 2b in order to output, together with the broadcast data having the first resolution, the broadcast data having the second resolution as OFDM-modulated waves from the transmitting apparatus 3. Then, the second re-multiplexing unit 2b outputs second transmission data generated by the above-described re-multiplexing process to the transmitting apparatus 3 through a second line 4b. The second line 4b is, for example, an IP network 40b. However, the second line 4b is not limited to the IP network and may be any of other types of lines different from the first line 4a.

The second re-multiplexing unit 2b inserts a delay control packet, which is a packet containing control information for compensating for the difference between the delay times of the first and second lines 4a and 4b, at a timing corresponding to the timing of the first packet of the OFDM frame, set by the first re-multiplexing unit 2a. When doing so, the second re-multiplexing unit 2b generates, as the above-described control information, an index value of a waiting time from a time when the delay control packet is received in the transmitting apparatus 3 to the start of the modulation process for the packet following the delay control packet.

The transmitting apparatus 3 is an apparatus that outputs data received from the re-multiplexing apparatus 2 as OFDM-modulated waves, and includes a delay correction unit 3a and a modulation processing unit 3b.

Based on the control information contained in the delay control packet generated by the second re-multiplexing unit 2b of the re-multiplexing apparatus 2, the delay correction unit 3a adjusts the timing at which the modulation process for the packet following the delay control packet starts. Further, the modulation processing unit 3b modulates the broadcast data having the first resolution and the broadcast data having the second resolution, and outputs the modulated data as OFDM-modulated waves.

According to the above-described configuration, a delay control packet for synchronizing the broadcast data having the first resolution with the broadcast data having the second resolution is generated by the second re-multiplexing unit 2b of the re-multiplexing apparatus 2. Then, the modulation processing unit 3b of the transmitting apparatus 3 performs a modulation process, which follows the process performed by the delay correction unit 3a, at the timing which has been adjusted by the delay correction unit 3a based on the delay control packet. Therefore, it is possible to synchronize, when the broadcast data having the first resolution and the broadcast data having the second resolution are broadcasted, their outputs with each other.

Figure 5:
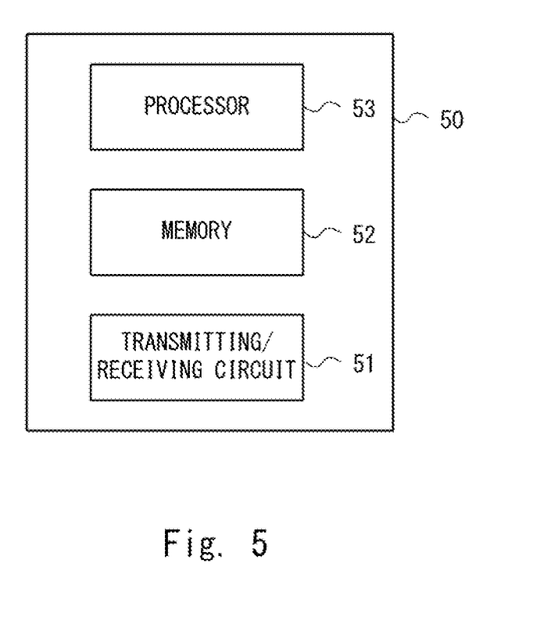
FIG. 5 is a block diagram showing an example of a configuration of a computer that performs processes described in an example embodiment.

The processes described above in each example embodiment may be implemented, for example, by a computer including a processor such as a CPU (Central Processing Unit) or an FPGA (Field Programmable Gate Array), each of which performs processes according to program control. That is, each of the re-multiplexing apparatuses 2 and 20, and the transmitting apparatus 3 and 30 may have functions as a computer. FIG. 5 is a block diagram showing an example of a configuration of a computer 50 that performs the processes described in any of the example embodiments. As shown in FIG. 5, the computer 50 includes a transmitting/receiving circuit 51, a memory 52, and a processor 53.

The transmitting/receiving circuit 51 serves as a transmitting circuit and a receiving circuit for transmitting/receiving data to/from other apparatuses. The memory 52 is composed of, for example, a combination of a volatile memory and a nonvolatile memory. The memory 52 is used to store software (a computer program) including at least one instruction, executed by the processor 53. The processor 53 performs processes by loading the software (the computer program) from the memory 52 and executing the loaded software.

Note that the aforementioned program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Although the present invention is explained above with reference to example embodiments, the present invention is not limited to the above-described example embodiments. Various modifications that can be understood by those skilled in the art can be made to the configuration and details of the present invention within the scope of the invention.

This application is based upon and claims the benefit of priority from Japanese patent application No. 2020-116182, filed on Jul. 6, 2020, the disclosure of which is incorporated herein in its entirety by reference.

REFERENCE SIGNS LIST 1, 10 BROADCASTING SYSTEM
2, 20 RE-MULTIPLEXING APPARATUS
2a FIRST RE-MULTIPLEXING UNIT
2b SECOND RE-MULTIPLEXING UNIT
3, 30 TRANSMITTING APPARATUS
3a DELAY CORRECTION UNIT
3b MODULATION PROCESSING UNIT
4a FIRST LINE
4b SECOND LINE
40a MICROWAVE LINE
40b IP NETWORK
50 COMPUTER
51 TRANSMITTING/RECEIVING CIRCUIT
52 MEMORY
53 PROCESSOR
210 2K RE-MULTIPLEXING UNIT
220 4K RE-MULTIPLEXING UNIT
221 RATE ADJUSTMENT UNIT
222 TIMING PACKET INSERTION UNIT
230 PACKET OUTPUT UNIT
300 MODULATION UNIT
301 SFN DELAY CORRECTION UNIT
302 OUTER CODE PROCESSING UNIT
303 HIERARCHICAL DIVIDING UNIT
304a, 304b, 312 ENERGY SPREADING UNIT
305a, 305b 2K DELAY CORRECTION UNIT
306a, 306b BYTE-INTERLEAVING UNIT
307a, 307b CONVOLUTIONAL CODING PROCESSING UNIT
308a, 308b, 315 BIT-INTERLEAVING PROCESSING UNIT
309a, 309b, 316 MAPPING PROCESSING UNIT
310 4K DELAY CORRECTION UNIT
311 FEC BLOCK FORMING UNIT
313 BCH CODING PROCESSING UNIT
314 LDPC CODING PROCESSING UNIT
317 HIERARCHICAL COMBINING UNIT
318 TIME-INTERLEAVING PROCESSING UNIT
319 FREQUENCY-INTERLEAVING PROCESSING UNIT
320 OFDM FRAME FORMING UNIT
321a, 321b IFFT PROCESSING UNIT 322a, 322b GUARD INTERVAL ADDING UNIT
323a, 323b QUADRATURE MODULATION PROCESSING UNIT

What is claimed is:

1. A re-multiplexing apparatus comprising:
at least one memory storing instructions; and
at least one processor configured to execute the instructions stored in the memory to:
perform a first re-multiplexing process for input broadcast data having a first resolution in order to output the broadcast data having the first resolution from at least one transmitting apparatus as an OFDM (Orthogonal Frequency Division Multiplexing) modulated wave;
output first transmission data generated by the first re-multiplexing process to the at least one transmitting apparatus through a first line;
perform a second re-multiplexing process for input broadcast data having a second resolution in order to output, together with the broadcast data having the first resolution, the broadcast data having the second resolution from the at least one transmitting apparatus as the OFDM-modulated wave; and
output second transmission data generated by the second re-multiplexing process to the at least one transmitting apparatus through a second line, wherein
in the second re-multiplexing process, a delay control packet is inserted at a timing corresponding to a timing of a first packet of an OFDM frame set by the first re-multiplexing process, the delay control packet containing control information for compensating for a difference between delay times of the first and second lines, and
in the second re-multiplexing process, an index value of a waiting time from a time when the delay control packet is received in the at least one transmitting apparatus to a start of a modulation process for a packet following the delay control packet is generated as the control information.

2. The re-multiplexing apparatus according to claim 1, wherein
in the first re-multiplexing process, the first transmission data is generated by multiplexing a parameter value of a predetermined parameter on the broadcast data having the first resolution at each cycle of the OFDM frame, and
in the second re-multiplexing process, the delay control packet further containing the parameter value as the control information is inserted.

3. The re-multiplexing apparatus according to claim 2, wherein the predetermined parameter is a TMCC_synchronization_word specified in ARM STD-B31.

4. The re-multiplexing apparatus according to claim 2, wherein the predetermined parameter is a continuity counter used in an MPEG-2 transport stream.

5. The re-multiplexing apparatus according to claim 1, wherein
the first line is a microwave line, and
the second line is an IP (Internet Protocol) network.

6. A re-multiplexing method performed by a computer and comprising:
performing a re-multiplexing process for input broadcast data having a first resolution in order to output the broadcast data having the first resolution from at least one transmitting apparatus as an OFDM-modulated wave (Orthogonal Frequency Division Multiplexing);
outputting first transmission data generated by the re-multiplexing process to the at least one transmitting apparatus through a first line;
performing a re-multiplexing process for input broadcast data having a second resolution in order to output, together with the broadcast data having the first resolution, the broadcast data having the second resolution from the at least one transmitting apparatus as the OFDM-modulated wave; and
outputting second transmission data generated by the re-multiplexing process to the at least one transmitting apparatus through a second line, wherein
in the re-multiplexing process for the broadcast data having the second resolution,
a delay control packet is generated, the delay control packet containing control information for compensating for a difference between delay times of the first and second lines,
the delay control packet is inserted at a timing corresponding to a timing of a first packet of an OFDM frame set in the re-multiplexing process for the broadcast data having the first resolution, and
an index value of a waiting time from a time when the delay control packet is received in the at least one transmitting apparatus to a start of a modulation process for a packet following the delay control packet is generated as the control information.

7. A non-transitory computer readable medium storing a program for causing a computer to perform:
performing a re-multiplexing process for input broadcast data having a first resolution in order to output the broadcast data having the first resolution from at least one transmitting apparatus as an OFDM-modulated wave (Orthogonal Frequency Division Multiplexing);
outputting first transmission data generated by the re-multiplexing process to the at least one transmitting apparatus through a first line;
performing a re-multiplexing process for input broadcast data having a second resolution in order to output, together with the broadcast data having the first resolution, the broadcast data having the second resolution from the at least one transmitting apparatus as the OFDM-modulated wave; and
outputting second transmission data generated by the re-multiplexing process to the at least one transmitting apparatus through a second line, wherein
in the re-multiplexing process for the broadcast data having the second resolution,
a delay control packet is inserted at a timing corresponding to a timing of a first packet of an OFDM frame set in the first re-multiplexing step, the delay control packet containing control information for compensating for a difference between delay times of the first and second lines, and
an index value of a waiting time from a time when the delay control packet is received in the at least one transmitting apparatus to a start of a modulation process for a packet following the delay control packet is generated as the control information.

\* \* \* \* \*